(12) United States Patent
Kaur et al.

(10) Patent No.: US 12,129,347 B2
(45) Date of Patent: Oct. 29, 2024

(54) CLICK CHEMISTRY FOR SEALANTS AND ADHESIVES

(71) Applicant: CHEM LINK, INC., Schoolcraft, MI (US)

(72) Inventors: Baljinder Kaur, Schoolcraft, MI (US); Jonathan Ballema, Schoolcraft, MI (US)

(73) Assignee: CHEM LINK, INC., Schoolcraft, MI (US)

( * ) Notice: Subject to any disclaimer, the term of this patent is extended or adjusted under 35 U.S.C. 154(b) by 0 days.

(21) Appl. No.: 18/326,244

(22) Filed: May 31, 2023

(65) Prior Publication Data

US 2023/0303783 A1    Sep. 28, 2023

Related U.S. Application Data

(60) Division of application No. 17/346,752, filed on Jun. 14, 2021, now Pat. No. 11,702,515, which is a continuation of application No. 15/975,943, filed on May 10, 2018, now Pat. No. 11,034,805.

(60) Provisional application No. 62/504,879, filed on May 11, 2017.

(51) Int. Cl.
| | |
|---|---|
| C08J 3/24 | (2006.01) |
| C08G 63/91 | (2006.01) |
| C09D 201/10 | (2006.01) |
| C09J 183/00 | (2006.01) |
| C09J 183/04 | (2006.01) |
| C09J 183/10 | (2006.01) |
| C09J 185/00 | (2006.01) |
| C09J 201/10 | (2006.01) |
| C09K 3/10 | (2006.01) |
| C08G 77/12 | (2006.01) |
| C08G 77/20 | (2006.01) |

(52) U.S. Cl.
CPC .............. *C08J 3/24* (2013.01); *C08G 63/91* (2013.01); *C09D 201/10* (2013.01); *C09J 183/00* (2013.01); *C09J 183/04* (2013.01); *C09J 183/10* (2013.01); *C09J 185/00* (2013.01); *C09J 201/10* (2013.01); *C09K 3/1018* (2013.01); *C08G 77/12* (2013.01); *C08G 77/20* (2013.01); *C08J 2333/06* (2013.01); *C08J 2333/12* (2013.01); *C08J 2347/00* (2013.01); *C08J 2367/00* (2013.01); *C08J 2371/00* (2013.01); *C08J 2381/04* (2013.01); *C08J 2383/04* (2013.01)

(58) Field of Classification Search
CPC .................... C08F 8/30; C08F 8/42
See application file for complete search history.

(56) References Cited

U.S. PATENT DOCUMENTS

| | | | |
|---|---|---|---|
| 4,871,827 A | 10/1989 | Klosowski et al. | |
| 8,071,708 B2* | 12/2011 | Ritter ..................... | C08G 77/26 528/38 |
| 8,592,545 B2 | 11/2013 | Mackinnon et al. | |
| 2003/0216536 A1* | 11/2003 | Levandoski ........... | C08G 77/08 528/10 |
| 2009/0253609 A1* | 10/2009 | Fleury ..................... | C07H 5/06 525/54.24 |
| 2011/0077365 A1 | 3/2011 | Yu et al. | |
| 2011/0112254 A1 | 5/2011 | Manzara et al. | |
| 2012/0021200 A1 | 1/2012 | Koberstein et al. | |
| 2012/0028858 A1 | 2/2012 | Wadgaonkar et al. | |
| 2015/0368530 A1 | 12/2015 | Carter et al. | |
| 2016/0130403 A1* | 5/2016 | Brook .................... | C08G 77/38 525/477 |

OTHER PUBLICATIONS

Mehmet Atilla Tasdelen et al., "Photoinduced Free Radical Promoted Copper(I)-Catalyzed Click Chemistry for Macromolecular Syntheses", Macromolecules, 2012, pp. 1-6.
Rambarran, Talena et al., "Generic, Metal-Free Cross Linking and Modification of Silicone Elastomers Using Click Ligation", Macromolecules 2012, 45, (2012), pp. 2276-2285.
Bertozzi, Carolyn R.; Univ. of California, Berkeley; "A Decade of Bioorthogonal Chemistry" Copyright 2011 American Chemical Society pp. 651-653.
Brei, Richard Mark, Univ. of Southern Mississippi, The Aquila Digital Community; "Curing of Polymer Thermosets via Click Reactions and on Demand Processes", May 2016; 202 pages.
Huisgen, Rolf; "Proceedings of the Chemical Society" Oct. 1961; Royal Society of Chemistry; p. 357.
Rambarran, Talena, et al., Journal of Polymer Science, Part A. "Amphiphilic Thermoset Elastomers from Metal- free, Click Crosslinking of PEG-grafted Silicone Surfactants"; Feb. 7, 2015; Wiley Periodicals, Inc.

(Continued)

*Primary Examiner* — Robert C Boyle
(74) *Attorney, Agent, or Firm* — TUCKER ELLIS, L.L.P.; J. Derek Mason

(57) ABSTRACT

The invention described herein generally pertains to a composition that includes a silyl-terminated polymer having silyl groups linked to a polymer backbone via triazole. The silyl-terminated polymer is a reaction product of a functionalized polymer backbone and a functionalized silane. The polymer backbone includes a first functional group, which may be one of an azide or an alkyne. The functionalized silane includes a second functional group may also be one of an azide or an alkyne, but is also different from the first functional group. The functionalized polymer backbone is reacted with the functionalized silane in the presence of a metal catalyst.

20 Claims, No Drawings

(56) References Cited

OTHER PUBLICATIONS

Isaacman, Michael J., et al., Journal of Polymer Science "Clickable Amphiphilic Triblock Copolymers"; Mar. 5, 2012; 11 pages.
Rambarran, Talena, H.B.SC.; New Routes to Functional Siloxanes: Applications of the Thermal Azide-Alkyne Cycloaddition for the Silicone Chemist; Sep. 2016; 276 pages.

* cited by examiner

CLICK CHEMISTRY FOR SEALANTS AND ADHESIVES

CROSS-REFERENCE TO RELATED APPLICATION(S)

This application is a divisional of U.S. patent application Ser. No. 17/346,752 filed on Jun. 14, 2021, which is a continuation of U.S. patent application Ser. No. 15/975,943 filed on May 10, 2018, and which claims the benefit of and priority to U.S. Provisional Application Ser. No. 62/504,879 filed on May 11, 2017. The entirety of these applications are herein incorporated by reference.

TECHNICAL FIELD

The invention generally relates to polymers useful in coatings, adhesives, and sealants and, in particular, adhesives and sealants made utilizing click chemistry.

BACKGROUND OF THE INVENTION

Two-part silicone sealants can be produced by an addition cure method involving a platinum catalyst. One method can include, for example, a silicone hydride and a vinyl, which react in the presence of a platinum catalyst to form an ethyl group bridge between the two components with no additional byproducts. Such platinum catalyzed hydrosilylation systems, while potentially fast curing, can be easily inhibited by tin, sulfur, or other functionalities present in the system (e.g., amines, etc.).

Further, silyl-modified polymers, such as silyl-modified polyethers (MS polymers) and silyl-modified polyurethanes (SPUR polymers) are commonly utilized in adhesives and sealants. In particular, such compositions have been used in one-component sealants that are moisture cured. Like the two-part sealants described above, hydrosilylation is often employed to form the silyl-modified polymers used in the moisture-curable sealants.

SUMMARY OF THE INVENTION

In accordance with an embodiment of the present invention, a composition is provided that includes a silyl-terminated polymer having silyl groups linked to a polymer backbone via triazole. The silyl-terminated polymer is a reaction product of a functionalized polymer backbone bearing a first functional group and a functionalized silane bearing a second functional group. The first functional group is one of an azide or an alkyne. The second functional group is also selected from the group consisting of an azide or an alkyne, but the second functional group is different from the first functional group. The azide-functionalized polymer backbone is reacted with the alkyne-functionalized silane in the presence of a copper I catalyst. The polymer backbone can include polyether, polyester, polydimethyl siloxane, polymethyl methacrylate, polyacrylate, polybutadiene, or polysulfide.

According to another embodiment, a method is provided for producing a curable composition. The method can include reacting a functionalized polymer bearing a first functional group with a functionalized silane bearing a second functional group. The first functional group is selected from a group consisting of an azide and an alkyne. The second functional group is different from the first functional group and can be selected from a group consisting of an azide and an alkyne. The reaction result is a silyl-terminated polymer having silyl groups linked to the polymer via a triazole moiety.

In yet another embodiment, a one-part, moisture-curable sealant composition is provided. The composition can include silyl-terminated polymer having silyl groups linked to a polymer backbone via triazole. The silyl-terminated polymer is a reaction product of a functionalized polymer backbone bearing a first functional group comprising one of an azide or an alkyne and a functionalized silane bearing a second functional group, which comprises one of an azide or an alkyne and is different from the first functional group. The composition can also include a catalyst to promote cross-linking of between silyl groups of silyl-terminated polymers.

These and other aspects of this invention will be evident when viewed in light of the detailed description and appended claims.

DETAILED DESCRIPTION OF THE INVENTION

Embodiments of the invention relate to applications of click chemistry in coatings, adhesives, and sealants. Click chemistry involves a cycloaddition reaction between alkyne and azide functional groups, typically in the presence of a copper I catalyst, to form a triazole bridge and is pictorially shown below:

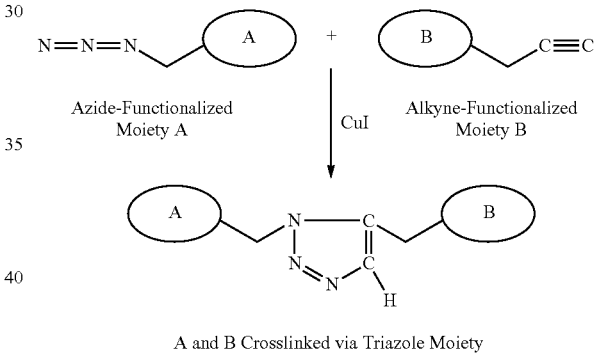

A and B Crosslinked via Triazole Moiety

The triazole ring is resistant to decomposition via hydrolysis, oxidation, and/or reduction even at high temperature. Moreover, click chemistry, unlike hydrosilylation, is tolerant to impurities and compatible with other functionalities in the a system such as amine, sulfur, and tin-based catalysts. Like hydrosilylation, however, click chemistry provides high yields, relatively simple implementation, and does not produce byproducts. Further, while the reaction is exothermic, a the activation energy is sufficiently high enough so that minimal triazole is formed at room temperature, thus providing working time and/or pot-life for sealant and adhesive formulations. After activation energy is reached, the reaction auto-accelerates until completion. Accordingly, click chemistry enable formation of versatile sealant and adhesive compositions incorporating a variety of functional groups.

In accordance with an aspect, click chemistry can be employed to make one-part moisture curable sealants based on silyl-terminated polymers. The sealant composition includes a polymer backbone, which can be polyether, polyester, polydimethyl siloxane, polymethyl methacrylate, polyacrylate, polybutadiene, polyurethane, or polysulfide. The sealant further includes a catalyst to promote cross-linking of silyl-terminate polymers in the presence of moisture, such as atmospheric moisture. The catalyst may be a tin-based catalyst. In addition, the system may include a moisture scavenger. A hybrid structure, having a combination of two or more different polymer backbones, can also be contemplated depending on desired properties of a final structure.

The polymer backbone is modified to include an azide group, which can react with alkyne-terminated silane to form the silyl-terminated polymer. Specifically, the polymer backbone is linked to a silane group via a triazole moiety. In an example, the reaction is in the presence of a copper I catalyst in a solvent such as dimethylformamide, which can be removed from the system after. This reaction is pictorially illustrated below.

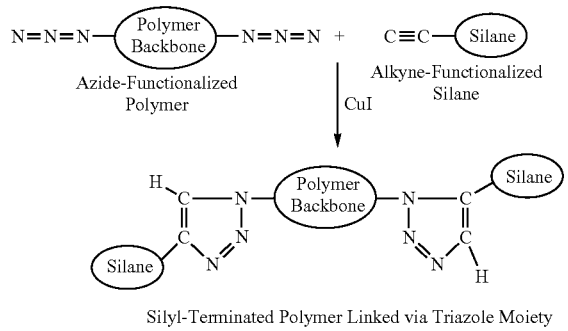

Silyl-Terminated Polymer Linked via Triazole Moiety

The azide group can be introduced in the polymer backbone in a variety of ways. For instance, a brominated polymer can be functionalized with the azide group. In particular, the brominated polymer can react with an azide, such as sodium azide in a dimethylformamide solvent as show below:

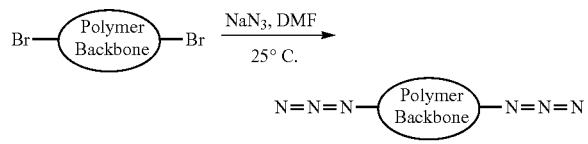

Alternatively, a polymer backbone bearing epoxide groups can be functionalized with azide groups as shown below:

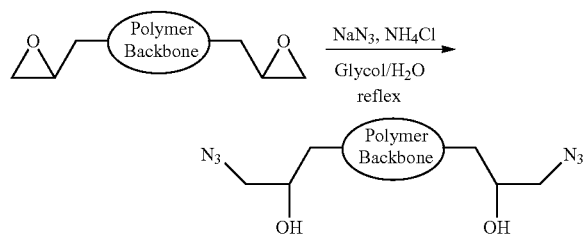

It is to be appreciated that a transverse arrangement can be contemplated where an alkyne-terminated polymer reacts with an azide-terminated silane. Moreover, as mentioned above, the polymer backbone can be any polymer such as, but not limited to, polyether, polyester, polydimethyl siloxane, polymethyl methacrylate, polyacrylate, polybutadiene, and polysulfide. In an aspect, the triazole moiety can be linked to the polymer backbone through either an alpha or gamma spacer.

A one-part moisture curable sealant, however, can include hybrid silyl-terminated polymers. For example, two or more different polymers can bear azide terminal groups and react with alkyne-functionalized silane to form silyl-terminated polymers linked via a triazole moiety.

In accordance with another aspect, two-part silicone or epoxy based sealant and adhesive compositions can be cross-linked via a triazole moiety formed with click chemistry. The silicone or epoxy components are functionalized with azide and alkyne groups and combined using a copper I catalyst. Hybrid two-part systems can also be made with a similar mechanism. For instance, azide-terminated siloxane crosslinks with an alkyne-terminated organic polymer. It is to be appreciated that the organic polymer can bear the azide group and the siloxane bears the alkyne group in such a hybrid two-part system. More generally, hybrid polymers enable combinations of different structural and/or functional properties associated with different polymer backbones. An azide-terminated organic polymer backbone can click with an alkyne-terminated inorganic polymer, such as siloxane or polysulfide. The transposition with an alkyne-terminated organic polymer and an alkyne-terminated inorganic polymer is also contemplated.

A hybrid polymer can be utilized in connection with other embodiments described above. For instance, a hybrid polymer can be formed as described above and the hybrid polymer can further be silyl-terminated via a further reaction.

In yet another aspect, metal-free adhesive and sealant compositions for electrical and/or medical applications are contemplated. As mentioned above, the cycloaddition reaction utilizes a copper I catalyst. Without the catalyst, the reaction typically occurs slowly and yields a mixture of isomers. With strained alkynes, however, the cycloaddition reaction can conduct thermally at low temperatures without a metal catalyst. Additional information regarding metal-free or catalyst free click chemistry can be found in Talena Rambarran et al., *Journal of polymer Science*, 2015, 53, 1082-1093 and F. Gonzaga et al., *Macromolecules*, 2009, 42, 9220-9224, both of which are herein incorporated by reference. While most adhesives and sealants employ a metal catalyst (e.g. platinum, tin, etc.), metal-free click chemistry with strained alkynes enables formation adhesive and sealant compositions suitable for electronics applications where presence of a metal catalyst is undesirable.

Metal-free systems can be utilized in combination with other embodiments described above. That is, strained alkynes capable of reacting with the azide functionality without the metal catalyst can be employed to form the silyl-terminated polymer, employed in the two-part sealants, or employed in the formation of the hybrid polymer.

In accordance with another aspect, an on-demand curing sealant is provided. As mentioned above, minimal triazole forms at room temperatures absent a catalyst. By introducing a copper II catalyst, the same minimal reaction occurs as copper II is inert. Copper II converts to copper I when exposed to ultraviolet light. Accordingly, a sealant composition having a copper II catalyst can be cured, on demand, with UV light. Alternatively, a reducing agent can be introduced to convert the copper II to copper I, in situ, to initiate curing. It is to be appreciated that the use of copper II can be combined with the silyl-terminated, two-part sealants, and two-part hybrid polymer embodiments described above.

According to an aspect, a composition is provided that includes a silyl-terminated polymer having silyl groups linked to a polymer backbone via triazole. The silyl-terminated polymer is a reaction product of: a functionalized polymer backbone bearing a first functional group comprising one of an azide or an alkyne; and a functionalized silane bearing a second functional group, which comprises one of an azide or an alkyne and is different from the first functional group.

According to an embodiment of the composition, the polymer backbone is selected from a group consisting of polyether, polyester, polydimethyl siloxane, polymethyl methacrylate, polyacrylate, polybutadiene, and polysulfide.

According to another embodiment of the composition, the functionalized polymer backbone is reacted with the functionalized silane in the presence of a metal catalyst. In an example, the metal catalyst is copper I.

According to another embodiment of the composition, copper II is added to the functionalized polymer backbone and the functionalized silane. The copper II is converted to copper I to effectuate a reaction between the functionalized polymer backbone and the functionalized silane to produce the silyl-terminated polymer. In one embodiment, the copper II is converted to copper I via exposure to ultraviolet radiation. According to another embodiment, the copper II is converted to copper I via introduction of a reducing agent.

According to yet another embodiment, one of the first or second functional groups is a strained alkyne group capable of reacting an azide group without a metal catalyst.

In a further embodiment, the functionalized polymer backbone is a hybrid polymer comprising an inorganic polymer backbone linked to an organic polymer backbone. The inorganic polymer backbone and the organic polymer are linked via triazole as a result of a click reaction.

In another embodiment, a method for producing a curable composition is provided.

The method can include reacting a functionalized polymer bearing a first functional group with a functionalized silane bearing a second functional group. The first functional group is selected from a group consisting of an azide and an alkyne. The second functional group is different from the first functional group and selected from a group consisting of an azide and an alkyne. The result is a silyl-terminated polymer having silyl groups linked to the polymer via a triazole moiety.

According to another embodiment of the method, the reaction is in the presence of a copper I catalyst.

In another embodiment of the method, the reaction can include adding copper II to a system including the functionalized polymer and the functionalized silane and converting the copper II to copper I to initiate the reaction. In one example, converting the copper II includes exposing the copper II to ultraviolet radiation. In another example, converting the copper II can include adding a reducing agent.

According to another embodiment of the method, the polymer is selected from a group consisting of polyether, polyester, polydimethyl siloxane, polymethyl methacrylate, polyacrylate, polybutadiene, and polysulfide.

According to another embodiment of the method, a catalyst is included to promote cross-linking of silyl groups in the presence of atmospheric moisture.

In yet another aspect, a one-part, moisture-curable sealant composition is provided. The composition includes a silyl-terminated polymer having silyl groups linked to a polymer backbone via triazole. The silyl-terminated polymer is a reaction product of: a functionalized polymer backbone bearing a first functional group comprising one of an azide or an alkyne; and a functionalized silane bearing a second functional group, which comprises one of an azide or an alkyne and is different from the first functional group. The composition also includes a catalyst to promote cross-linking of between silyl groups of silyl-terminated polymers.

According to an embodiment of the sealant composition, the polymer backbone is selected from a group consisting of polyether, polyester, polydimethyl siloxane, polymethyl methacrylate, polyacrylate, polybutadiene, and polysulfide.

The above examples are merely illustrative of several possible embodiments of various aspects of the present invention, wherein equivalent alterations and/or modifications will occur to others skilled in the art upon reading and understanding this specification and the annexed drawings. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any compositions or products and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A method for producing a curable composition, comprising:
mixing a functionalized polymer bearing a first functional group with a functionalized silane bearing a second functional group in the presence of a non-activated metal catalyst, wherein the functionalized polymer either contains a silyl group or contains two or more of the first functional group,
wherein the first functional group is selected from a group consisting of an azide and an alkyne,
wherein the second functional group is different from the first functional group and selected from a group consisting of an azide and an alkyne,
wherein one of the first or second functional groups is a strained alkyne group capable of reacting with an azide group without the metal catalyst,
wherein the result is a silyl-terminated polymer having a first silane group and a second silane group, the first silane group linked to the functionalized polymer via a first triazole moiety, the second silane group is either present in the functionalized polymer or the second silane group is linked to the functionalized polymer via a second triazole moiety, and
wherein the metal catalyst, upon activation, catalyzes cross-linking of the first silane group and the second silane group.

2. The method of claim 1, wherein the functionalized polymer is an inorganic polymer.

3. The method of claim 1, wherein the functionalized polymer is an organic polymer.

4. The method of claim 1, wherein the functionalized polymer is a hybrid polymer comprising an inorganic polymer linked to an organic polymer.

5. The method of claim 4, wherein the inorganic polymer and the organic polymer are linked via triazole as a result of a click reaction.

6. The method of claim 1, wherein the metal catalyst comprises copper II and is configured to convert to copper I upon exposure to ultraviolet light, and wherein the metal catalyst catalyzes cross-linking upon exposure to the ultraviolet light.

7. The method of claim 1, further comprising:
introducing a reducing agent during the mixing.

8. The method of claim 7, wherein the metal catalyst comprises copper II, and wherein the reducing agent converts the metal catalyst into copper I to promote cross-linking.

9. A method for producing a curable composition, comprising:
mixing a functionalized polymer backbone comprising a first functional group and a functionalized silane comprising a second functional group in the presence of a catalyst,
wherein the first functional group is selected from a group comprising one of an azide or an alkyne,
wherein the second functional group is selected from a group comprising one of an azide or an alkyne,
wherein the second functional group is different than the first functional group,
wherein the functionalized polymer backbone is a hybrid polymer comprising an inorganic polymer backbone linked to an organic polymer, and
wherein the catalyst is configured to promote cross-linking in the mixture to form the curable composition.

10. The method of claim 9, wherein a moisture scavenger is also mixed with the functionalized polymer backbone, the functionalized silane, and the catalyst.

11. The method of claim 9, wherein the first and second functional groups react upon mixing to form a silyl-terminated polymer, and wherein the catalyst catalyzes cross-linking between silyl groups of the silyl-terminated polymers.

12. The method of claim 11, wherein the mixing occurs in the presence of moisture, and wherein the moisture is also configured to promote cross-linking between silyl groups of the silyl-terminated polymer during mixing.

13. The method of claim 12, wherein the catalyst comprises tin.

14. A method comprising:
mixing a functionalized polymer backbone bearing a first functional group and a functionalized silane bearing a second functional group to form a cured sealant, wherein the functionalized polymer backbone is a hybrid polymer comprising an inorganic polymer backbone linked to an organic polymer backbone,
wherein the first functional group comprises one of an azide or an alkyne,
wherein the second functional group comprises one of an azide or an alkyne and is different from the first functional group, and
wherein one of the first or second functional groups is a strained alkyne group.

15. The method of claim 14, wherein the cured sealant comprises a silyl-terminated polymer.

16. The method of claim 14, wherein a metal catalyst comprising copper II is mixed with the functionalized polymer backbone and the functionalized silane, and wherein the copper II of the metal catalyst is converted to copper I to catalyze cross-linking to form the cured sealant.

17. The method of claim 14, wherein the strained alkyne group is capable of reacting with an azide group without a metal catalyst to form the cured sealant.

18. A method comprising:
mixing a metal catalyst comprising copper II with a functionalized polymer backbone bearing a first functional group and a functionalized silane bearing a second functional group, wherein the copper II of the metal catalyst is converted to copper I to catalyze cross-linking, to form a cured sealant,
wherein the first functional group comprises one of an azide or an alkyne,
wherein the second functional group comprises one of an azide or an alkyne and is different from the first functional group, and
wherein one of the first or second functional groups is a strained alkyne group.

19. The method of claim 18, wherein the cured sealant comprises a silyl-terminated polymer.

20. The method of claim 18, wherein the strained alkyne group is capable of reacting with an azide group without a metal catalyst to form the cured sealant.

* * * * *